Feb. 19, 1963   H. W. BOOK   3,078,411
ELECTRICAL APPARATUS
Filed Jan. 30, 1959
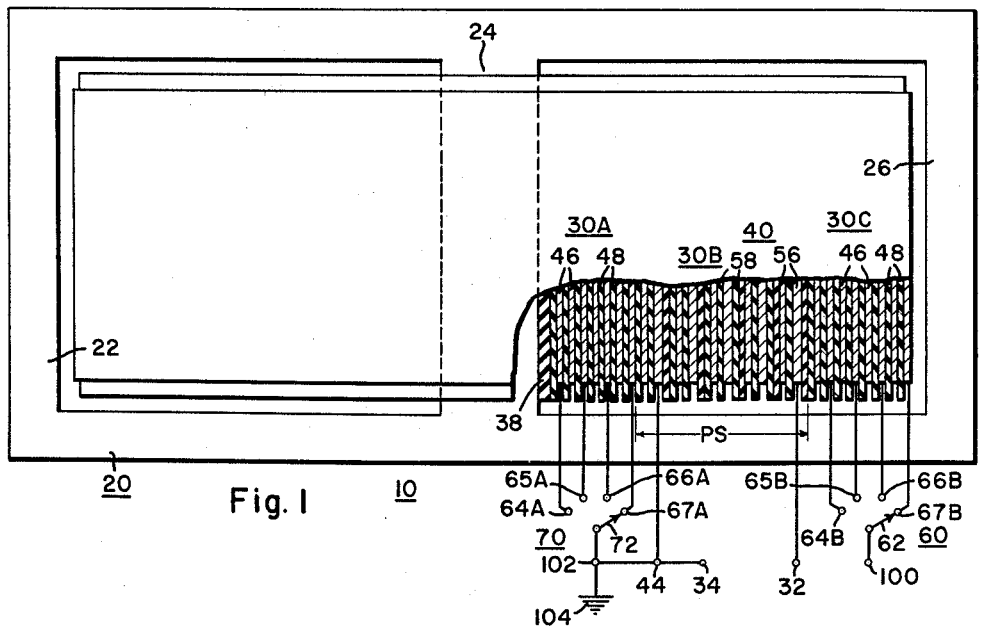
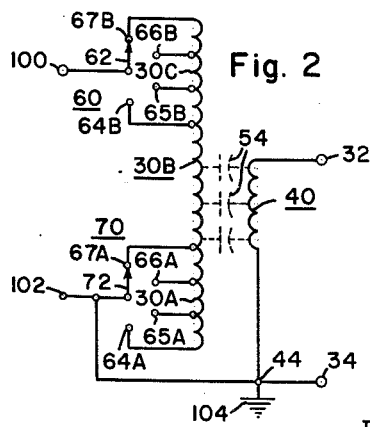
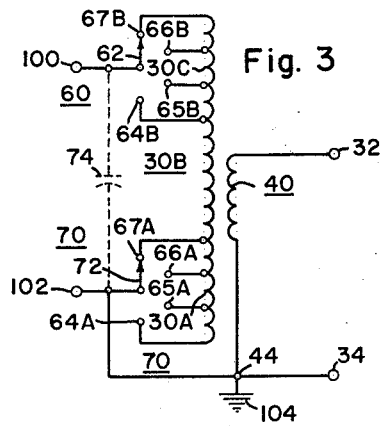
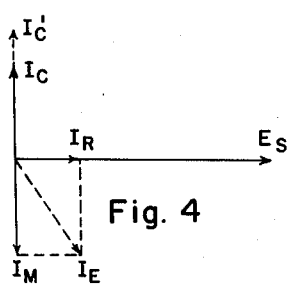
WITNESSES
John C. Hensley, Jr.
Clement L. McHale
INVENTOR
Herbert W. Book
BY
F. E. Browder
ATTORNEY

United States Patent Office 3,078,411
Patented Feb. 19, 1963

3,078,411
ELECTRICAL APPARATUS
Herbert W. Book, Hickory Township, Mercer County, Pa., assignor to Westinghouse Electric Corporation, East Pittsburgh, Pa., a corporation of Pennsylvania
Filed Jan. 30, 1959, Ser. No. 790,287
13 Claims. (Cl. 323—43.5)

This invention relates to electrical induction apparatus such as transformers, and more particularly to the windings of such apparatus.

In copending application Serial No. 745,555, filed by Arthur M. Lockie and assigned to the same assignee as the present application, a new and improved construction is disclosed for the windings of an electrical apparatus, such as a transformer, in which a predetermined capacitance is provided between said windings. As disclosed in said copending application, the effect of the capacitance provided between the windings is fixed, since the voltage applied to said capacitance remains substantially constant when a given potential is applied to one of the windings. In certain applications, such as in rural areas, where long radial feeder lines are employed, it is desirable that the voltage applied to the capacitance between the windings be adjustable or variable, preferably independently of the ratio between the turns of said windings. It is therefore desirable to provide a new and improved electrical apparatus, such as a transformer, having all the advantages of the winding construction disclosed in said copending application and having several additional advantages, such as the voltage applied to the capacitance between the windings being variable independently of the ratio between the turns of said windings.

It is an object of this invention to provide a new and improved electrical apparatus.

Another object of the invention is to provide a predetermined capacitance between the windings of an electrical introduction apparatus, such as a transformer.

A further object of this invention is to provide a predetermined capacitance between the windings of an electrical induction apparatus, such as a transformer, the effect of said capacitance being variable independently of the ratio between the turns of said windings.

Other objects of the invention will, in part, be obvious, and will, in part, appear hereinafter.

For a fuller understanding of the nature and objects of the invention, reference should be had to the following detailed description taken in connection with the accompanying drawing in which:

FIGURE 1 is a front elevational view, partly in section, and partly schematic, of a transformer core and coil assembly illustrating one embodiment of this invention.

FIGS. 2 and 3 are equivalent schematic diagrams of the windings of the transformer core and coil assembly shown in FIG. 1, and FIG. 4 is a vector diagram of some of the voltages and currents associated with the transformer core and coil assembly shown in FIG. 1.

Referring now to the drawings and FIG. 1 in particular, there is illustrated a transformer core and coil assembly 10 comprising a first winding 30, including first, second, and third winding portions 30A, 30B and 30C, respectively, and a second winding 40, which are both inductively disposed on a magnetic core 20. The magnetic core 20 is illustrated as being of the shell-form type and includes two windows which are formed by the first and second outer leg member 22 and 26, respectively, and a middle or winding leg member 24 on which the windings 20 and 30 are disposed. The winding leg member 24 is enclosed by a tube or barrier 38 on which the windings 20 and 30 are wound.

The first, second and third winding portions 30A, 30B and 30C, respectively, of the first or primary winding 30 each comprises a plurality of turns of a first layer of conducting sheet material 46 and a second layer of insulating sheet material 48 which are generally spirally wound together about a portion of the magnetic core 20, specifically, the winding leg member 24 in this case. The winding portions 30A, 30B and 30C of the primary winding 30 are effectively connected in series circuit relation and the layer of conducting sheet material 46 is preferably continuously wound for all three of said winding portions of the primary winding 30. The width of the insulating sheet or film material 48 is preferably greater than the width of the layer of conducting sheet or foil material 46 in order to provide additional "creep" insulation between the adjacent turns of the primary winding 30. The tube 38 provides mechanical support for the primary winding 30 and may be formed from insulating material in certain applications to insulate the winding 30 from the winding leg member 24 of the magnetic core 20. The conducting sheet material 46 and the insulating sheet material 48 are both of a general type in which the axial dimension of the material is relatively large compared to the radial dimension.

In winding the primary winding 30, the first winding portion 30A would be wound with a predetermined number of turns, each of said turns including only a layer of the conducting material 46 and a layer of the insulating material 48.

After the first portion 30A of the primary winding 30 has been wound, the winding of the second or secondary winding 40 is started. The secondary winding 40 comprises a plurality of turns, each of said turns including two layers of insulating sheet or film material 58 and a layer of conducting sheet or foil material 56 disposed therebetween. After the first portion 30A of the primary winding 30 has been wound, the secondary winding 40 and the second winding portion 30B of the primary winding 30 are wound simultaneously. In other words, the three layers of material which comprise the secondary winding 40 are added to the two layers of material which make up the second winding portion 30B of the primary winding 30, and the five layers of material are then wound simultaneously. The turns of the secondary winding 40 are therefore continuously interleaved with the adjacent turns of the second winding portion 30B of the primary winding 30 as indicated at PS in FIG. 1. In the portion 30B of the primary winding 30 in which the turns of the secondary winding 40 are wound simultaneously, each turn of the combined primary and secondary windings as indicated at PS includes a layer of the conducting material 46 and a layer of the insulating material 48 which make up the primary winding 30, and two layers of the insulating material 58 and the layer of conducting material 56 which make up the secondary winding 40. Similarly to the winding 30, the width of the layers of insulating sheet material 58 of the secondary winding 40 is preferably greater than the width of the layer of conducting sheet material 56 of the winding 40. It is to be understood that the turns of the secondary winding 40 may be wound with only one layer of the insulating material 58.

As described, the turns of the secondary winding 40 are wound simultaneously with a portion of the turns of the overall primary winding 30 and continuously interleaved with the adjacent turns of said primary winding for reasons which will be explained hereinafter. After the combined turns of the second winding portion 30B of the primary winding 30 and the secondary winding 40 have been wound as indicated at PS, the third winding portion 30C of the primary winding 30 is wound with a predetermined number of turns, each of said turns of said third winding portion including only the layer of conducting sheet material 46 and the layer of insulating sheet material 48. The turns of the secondary winding 40 therefore start and stop at first and second predetermined turns of the overall primary winding 30.

In order to vary the active turns included in the primary winding 30 for reasons which will be explained hereinafter, first and second means, more specifically the first and second tap changing means 60 and 70, respectively, are connected in circuit relation with the primary winding 30. In particular, the first tap changing means 60 comprises a selector switch 62 and a plurality of tap connections 64B through 67B which are connected to different turns of the third winding portion 30C at the outer end of the overall primary winding 30. As shown, the first tap changing means 60 is arranged to vary the active turns included in the third winding portion 30C of the primary winding 30 by selectively connecting the terminal 100 through one of the tap connections 64B to 67B to different turns of the conducting sheet material 46 of the third winding portion 30C. Similarly, the second tap changing means 70 comprises a selector switch 72 and a plurality of tap connections 64A through 67A which are connected to different turns of the conducting sheet material 46 of the first winding portion 30A at the inner end of the overall primary winding 30. The second tap changing means 70 similarly varies the active turns in the first winding portion 30A of the primary winding 30 by selectively connecting the terminal 102 through one of the tap connections 64A to 67A to different turns of the first winding portion 30A of the primary winding 30.

The inner end of the overall primary winding 30 is selectively connected to the terminal 102 by the second tap changing means 70 and the outer end of said primary winding is selectively connected to the terminal 100 by the first tap changing means 60 as just described. The active number of turns included in the overall primary winding 30 may be varied or adjusted by changing the position of the selector switches 62 and 72 of the first and second tap changing means 60 and 70, respectively. The inner end or turn of the conducting sheet material 56 of the secondary winding 40 is connected to the terminal 44 as shown in FIG. 1. The outer end or turn of the conducting sheet material 56 of the secondary winding 40 is connected to the terminal 32. Since one point or turn of each of the primary and secondary windings 30 and 40, respectively, must be connected to a common terminal or point for reasons which will be explained hereinafter, the inner end of the primary winding 30 at the terminal 102 and the inner end of the secondary winding 40 at the terminal 44 are both connected to a common terminal, as indicated by the ground connection 104. The inner end of the secondary winding 40 is also connected to the terminal 34 through the terminal 44. It is to be understood that other methods of connecting one point or turn of each of the windings 30 and 40 to a common point may be used in practicing this invention. For example, the inner end of the primary winding 30 at the terminal 102 could be connected to the ground connection 104 and the mid-point (not shown) of the secondary winding 40 might also be connected to said ground connection in a particular application.

The manner in which the primary winding 30 and the secondary winding 40 are constructed or arranged with the adjacent turns of the respective windings being continuously interleaved, has several important results. A first important result is, that if a potential is applied to the primary winding 30 between the terminals 100 and 102, the potential will distribute itself substantially uniformly among the active turns of said primary winding. In other words, if a potential $V$ is applied to the primary winding 30 having $N$ number of active turns as determined by the first and second tap changing means 60 and 70, respectively, the potential associated with each active turn of the primary winding will be substantially equal to $V/N$. If the inner end of the primary winding 30 is connected to the ground connection 104 as shown in FIG. 1, the voltage associated with each of the active turns of the said primary winding gradually increases in accordance with the number of active turns between any particular active turn of said primary winding and the inner end of said primary winding which is connected to the ground terminal 104 through the second tap changing means 70. For example, if the number of active turns included in the first winding portion 30A of the primary winding 30 is "$a$," the voltage associated with the predetermined turn of the primary winding 30 at which the turns of the secondary winding 40 start, will be substantially equal to "$a$" times $V/N$. The potential difference or stress, therefore, between the first turn at the inner end of the secondary winding 40 and the adjacent turn of the primary winding 30 will be equal to "$a$" times $V/N$, since the inner end of the secondary winding 40 is also connected to the ground connection 104. Since the adjacent turns of the primary winding 30 and the secondary winding 40 are continuously interleaved and wound together turn for turn, the potential difference or stress between the adjacent turns of the primary winding 30 and the secondary winding 40 will be substantially uniform or at a predetermined value. This is because the voltage associated with the active turns of the primary winding 30 increases uniformly in accordance with the number of active turns between a particular turn of the primary winding 30 and the inner end of said primary winding as selected by the second tap changing means 70, and the voltage associated with the turns of the secondary winding 40 increases at a corresponding rate. The potential difference or stress therefore between the adjacent turns of the primary winding 30 and the secondary winding 40 will be substantially uniform.

A second important result arising from the manner in which the adjacent turns of the primary winding 30 and the secondary winding 40 are continuously interleaved is that a predetermined capacitance is provided between the adjacent turns of the windings 30 and 40, as shown in the equivalent schematic diagram in FIG. 2. As illustrated, the active turns of the primary winding 30 are connected across terminals 100 and 102 through the first and second tap changing means 60 and 70, respectively. The secondary winding 40 is connected across the terminals 32 and 34. The terminals 102 and 34 are connected to the common ground connection, as indicated at 104. The inherent distributed capacitance between the adjacent turns of the primary winding 30 and the secondary winding 40 is indicated at 54.

The capacitance 54 varies with several factors. For example, the capacitance 54 varies with the effective adjacent areas of the layers of conducting sheet material 46 and 56 included in the primary winding 30 and the secondary winding 40, respectively. The capacitance 54 also varies with the dielectric constant and with the thickness of each of the layers of insulating sheet material 48 and 58 included in the primary winding 30 and the secondary winding 40, respectively. Since the current through the distributed capacitance 54 is independent of any current which flows to a load or load circuit (not shown) connected across the secondary winding 40 at the terminals 32 and 34 when a potential is applied across the active turns of the primary winding 30 at the terminals 100 and 102 through the first and second tap changing means 60 and 70, respectively, the equivalent schematic diagram of the windings 30 and 40 may also be represented as shown in FIG. 3. The effect of the distributed capacitance between the adjacent turns of the windings 30 and 40 may be represented as an effective capacitance 74, as shown in FIG. 3, which has the effect of a capacitance connected in shunt or in parallel with the primary winding 30.

The effect of the capacitance provided between the adjacent turns of the windings 30 and 40 as a reactance, also varies with the square of the potential of the voltage applied across the insulation between the adjacent turns of said windings, considered as a dielectric material. The turns of the secondary winding 40 are only wound simultaneously with a portion of the turns of the overall primary winding 30, as indicated at 30B. The point at which the turns of the secondary winding 40 are disposed either at the inner end of the active turns of the primary winding 30 or toward the outer end of the active turns of said primary winding or intermediate the ends of the active turns of said primary winding determines the potential applied across the insulation between the adjacent active turns of the primary winding 30 and the secondary winding 40, considered as a dielectric, which, in turn, determines the potential applied to the predetermined capacitance between the adjacent turns of the windings 20 and 30. One point or turn of each of the windings 30 and 40 must be connected to a common terminal in order to provide a charging path to charge the insulation between the adjacent active turns of the windings 30 and 40, considered as a dielectric, when a potential is applied across the active turns of the primary winding 30 and a corresponding potential difference or stress exists between the adjacent turns of the windings 30 and 40.

The effect of the operation of the first and second tap changing means 60 and 70, respectively, on the voltage applied to the predetermined capacitance between the adjacent active turns of the windings 30 and 40 will now be considered. In general, the operation of the first and second tap changing means 60 and 170, respectively, permits a variation or adjustment in the voltage applied to said predetermined capacitance and in the effect of said capacitance as a reactance when a given potential is applied across the active turns of the primary winding 30 at the terminals 100 and 102, which may be accomplished independently of the ratio between the active turns of the primary winding 30 and the secondary winding 40.

In particular, let it be assumed that the position of the selector switches 62 and 72 of the first and second tap changing means 60 and 70, respectively, is as indicated in FIG. 2, said selector switches being connected to the tap connections 67B and 67A, respectively. As shown, the number of active turns between the inner or lower end of the primary winding 30 and the start of the turns of the secondary winding 40 is substantially negligible and the first active turn of the primary winding 30 is adjacent to the first turn of the secondary winding 40. Since the secondary winding 40 includes no tap connections, as illustrated, all the turns of said secondary windings may be considered to be active and the first active turns at the lower or inner end of the primary winding 30 and the secondary winding 40 for the position of the second tap changing means 70, shown in FIG. 2, are both connected to the ground connection 104. The potential difference or stress between the first adjacent active turns of said windings is, therefore, negligible. Since the potential stress between the adjacent active turns of said windings is substantially uniform, the voltage applied to the predetermined capacitance between said windings is also substantially negligible. The effect of the predetermined capacitance 54 as a reactance is also negligible since the voltage applied to said capacitance is negligible.

If the selector switches 62 and 72 of the first and second tap changing means 60 and 70, respectively, are both moved to the next corresponding positions 66B and 66A, respectively, the active turns of the primary winding 30 are now shifted in a downward direction with the number of active turns remaining substantially the same and the corresponding ratio between the active turns of the primary winding 30 and the secondary winding 40 also remaining substantially the same. The voltage applied to the capacitance 54 between the windings 30 and 40 is now increased, however, from a negligible value to a voltage determined by the number of turns between the tap connections 66A and 67A of the second tap changing means 70 for a given potential applied at the terminals 100 and 102. The voltage applied to the capacitance 54 is substantially equal to the voltage applied at the terminals 100 and 102 divided by the active turns of the primary winding 30 between the tap connections 66A and 66B times the number of turns between the tap connections 66A and 67A, as previously discussed in detail in connection with the potential distribution in the primary winding 30. Similarly, the voltage applied to the capacitance 54 and the effect of said capacitance as a reactance may be further increased, independently of the ratio between the turns of said windings, by further movement of the selector switches 62 and 72 of the first and second tap changing means 60 and 70, respectively, to corresponding tap connections to thereby increase the number of active turns between the inner or lower end of the primary winding 30 and the starting or first turn of the secondary winding 40 at the lower end of said secondary winding.

Referring to the vector diagram of FIG. 4, the manner in which the capacitance provided between the adjacent turns of the primary winding 30 and the secondary winding 40 affects the operation of the core and coil assembly shown in FIG. 1 is illustrated. The vector $E_S$ represents the applied potential across the active turns of the primary winding 30 between the terminals 100 and 102. The vector $I_E$ represents the normal lagging power factor exciting current that would flow in the core and coil assembly 10 in the absence of the predetermined capacitance provided between the primary winding 30 and the secondary winding 40. The vectors $I_R$ and $I_M$ represent the core loss component and the magnetizing component, respectively, of the exciting current $I_E$. The vectors $I_C$ and $I_C'$ represent the leading power factor currents drawn by the effective predetermined capacitance between the windings 30 and 40 for different corresponding positions of the first and second tap changing means 60 and 70, respectively, when the potential $E_S$ is applied to the active turns of the primary winding 30 through said tap changing means.

The magnetizing component $I_M$ of the exciting current $I_E$ lags the applied potential $E_S$ by 90°. The core loss component $I_R$ of the exciting current $I_E$ is in phase with the applied voltage $E_S$. The leading power factor current $I_C$ drawn by the capacitance between the windings 30 and 40 for particular corresponding positions of the first and second tap changing means 60 and 70, respectively (other than for the corresponding tap connections 67B and 67A, respectively), leads the applied potential $E_S$ by an angle of substantially 90°. Since the magnetizing component $I_M$ of the exciting current $I_E$ and the leading power factor current $I_C$ drawn by the capacitance between the windings 30 and 40 are substantially 180° out of phase, a core and coil assembly 10 may be designed so that the leading power factor current $I_C$ substantially cancels the magnetizing component $I_M$ of the exciting current $I_E$ for particular corresponding positions of the first and second tap changing means 60 and 70, respectively, as shown in FIG. 4. The voltage applied to the capacitance between the windings 30 and 40 may be increased, however, to such a value that the capacitance draws a leading power factor current $I_C'$ which is even larger than the magnetizing component $I_M$ of the exciting current $I_E$ by changing the first and second tap changing means 60 and 70 to new corresponding positions without affecting the ratio between the turns of said windings. This means that, even when the transformer core and coil assembly 10 is not connected to a load across the secondary winding 40, the core and coil assembly 10 may be designed to draw a leading power factor no-load current. In the latter case, the leading power factor no-load current drawn by a core and coil assembly as disclosed offsets the lagging power factor current being drawn elsewhere in a distribution system to thereby increase the overall efficiency of the distribution system.

In summary, the voltage applied across the capacitance between the adjacent turns of the windings of an electrical apparatus as disclosed may be varied or adjusted independently of the ratio between the turns of said windings and without changing the relative physical positions of said windings. In other words, the relative electrical position of one of the windings of an apparatus as disclosed may be shifted or adjusted to vary the voltage across a substantially predetermined value of capacitance between the adjacent turns of said windings by varying the active turns between one end of one of the windings and the first or starting turn of the other winding. In order to maintain the active turns in the first-mentioned winding at a predetermined value, a corresponding offsetting change in the active turns of said winding is made elsewhere in said winding. In the invention, as illustrated in FIGS. 1 through 3, the latter corresponding offsetting change in the turns of one of the windings is made at the opposite end of said winding or at the outer end of said winding. Since in a winding arrangement as disclosed, corresponding changes are made in the active turns at one end of one winding and at a point displaced from one end of said winding, it may be advisable in certain applications to provide two tap changing means, such as the tap changing means 60 and 70, of a conventional type which are ganged together for simultaneous operation to corresponding positions. It is also to be understood that the teachings of the invention may be incorporated in electrical apparatus in which the means employed for changing the active turns of one winding may be other than the tap changing means 60 and 70, which were used to illustrate the invention. For example, conventional devices, such as those including sliding contacts may be employed.

It is to be noted that while the first and second tap changing means 60 and 70, respectively, may be employed to vary the voltage applied to the capacitance between two windings of an apparatus as disclosed, said tap changing means may also be employed in a conventional manner to vary the ratio of turns between said windings to thereby vary the voltage across one winding when a potential is applied to the other winding. For example, if the selector switch 72 of the second tap changing means 70 is moved from the tap connection 67A to the tap connection 66A, while the selector switch 62 of the first tap changing means 60 remains connected to the tap connection 67B, then the number of active turns included in the primary winding 30, as well as the ratio between the turns of said primary winding and the secondary winding 40 will be increased to thereby reduce the voltage across the secondary winding 40 for a given potential applied across the active turns of the primary winding 30 at the terminals 100 and 102. On the other hand, if the selector switch 62 of the first tap changing means 60 is moved from the tap connection 67B to the tap connection 66B while the selector switch 72 of the second tap changing means 70 remains connected to the tap connection 67A, then the number of active turns in the primary winding 30 will be reduced along with the ratio of the turns between said primary winding and the secondary winding 40 to thereby increase the voltage across said secondary winding when a given potential is applied across the active turns of said primary winding at the terminals 100 and 102.

In summary, an electrical inductive apparatus such as a transformer as disclosed would include at least two windings whose adjacent turns are continuously interleaved to provide a predetermined capacitance between said windings. In addition, an apparatus as disclosed would include means for adjusting the active turns at one end of one of the windings as disclosed, and means for adjusting the active turns elsewhere in the same winding to thereby introduce a variable displacement between the active starting turns of both of said windings, which may be accomplished independently of the ratio between the turns of said windings.

Similarly to the winding construction disclosed in the copending application previously mentioned, it is to be understood that other forms of apparatus incorporating the teachings of the invention may be provided with different arrangements of the insulation between the turns of the respective windings. For example, instead of using separate layers of sheet or film insulation between the turns of the primary winding 30, the layer of conducting sheet material 46 may be coated with an insulating material, such as enamel, and the edges of the turns may be coated with other suitable insulating materials, such as insulating resins, to provide insulation between the turns of said primary windings and between said winding and the core structure or ground. In addition, while the windings as disclosed inherently have excellent heat dissipation characteristics, it may be advisable or necessary in larger ratings to incorporate or wind in conventional duct formers to provide additional cooling. Since there is substantially no potential difference along the vertical axis of the turns of the windings as disclosed, the latter duct formers could be formed from a material having a high thermal conductivity, such as a metal bar. It is anticipated that the conducting sheet material employed in practicing the invention would preferably be a metallic material, such as copper or aluminum. Other modifications such as indicated for the basic winding construction disclosed in the copending application previously mentioned may also be applied to the invention as disclosed.

The apparatus embodying the teachings of this invention has all of the advantages of the winding construction disclosed in said copending application, with respect to improving the power factor of a distribution system, space factor, and mechanical strength and has several additional advantages. A first additional advantage is that the voltage applied to the predetermined capacitance provided between the windings of an apparatus as disclosed may be varied independently of the ratio between the turns of said windings and without changing the relative physical positions of said windings. The latter advantage is of particular importance, since the effect of the predetermined capacitance as a reactance varies as the square of the voltage applied to said capacitance. If the voltage applied to said capacitance is varied by means of tap changing equipment, the latter tap changing equipment can also be employed for conventional ratio or voltage control in an apparatus as disclosed Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. An electrical apparatus comprising a magnetic core, a first winding including a plurality of turns of a layer of conducting sheet material and a layer of insulating sheet material wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between the turns of said first and second windings, one turn of each of the layers of conducting sheet material of said first and second windings being connected to a common terminal, and first and second means for changing the active turns at the inner and outer ends, respectively, of one of said windings to vary the voltage applied to said capacitance when a potential is applied across one of said windings substantially independently of the ratio between the turns of said first and second windings, said first and second means being connected in circuit relation with the associated winding.

2. An electrical apparatus comprising a magnetic core, a first winding including a plurality of turns of a layer of conducting sheet material and a layer of insulating sheet material wound together on said core, the width of said insulating sheet material being greater than the width of said conducting sheet material, a second winding including a plurality of turns of a layer of conducting sheet material and at least one layer of insulating sheet material, the turns of said second winding being wound with and continuously interleaved with a portion of the turns of said first winding to provide a predetermined capacitance between the turns of said first and second windings, one turn of each of the layers of conducting sheet material of said first and second windings being connected to a common terminal, and first and second means for changing the active turns at the inner and outer ends, respectively, of one of said windings to vary the voltage applied to said capacitance substantially independently of the ratio between the turns of said first and second winding.

3. An electrical apparatus comprising a magnetic core, a first winding including a plurality of turns of a layer of conducting sheet material and a layer of insulating sheet material wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between the turns of said first and second windings, one turn of each of the layers of conducting sheet material of said first and second windings being connected to a common terminal, the voltage stress between the adjacent turns of said first and second windings being substantially uniform when a potential is applied to one of said windings, and first and second means for changing the active turns at the inner and outer ends, respectively, of one of said windings in an offsetting manner to vary the voltage applied to said capacitance substantially independently of the ratio between the turns of said first and second winding.

4. A transformer comprising a first winding including a plurality of generally spirally wound turns of conducting sheet material having a coating of insulation on at least one side, a second winding including a plurality of turns of conducting sheet material having a coating of insulation on at least one side, the turns of said second winding being wound with and continuously interleaved with a portion of the turns of said first winding to provide a predetermined capacitance between said first and second windings, one turn of each of said windings being electrically connected to a common terminal, and first and second means for changing the active turns at the inner and outer ends, respectively, of one of said windings to vary the voltage applied to said capacitance substantially independently of the ratio between the turns of said first and second winding.

5. A transformer comprising a first winding including a plurality of generally spirally wound turns of conducting sheet material having a coating of insulation on at least one side, a second winding including a plurality of turns of conducting sheet material having a coating of insulation on at least one side, the turns of said second winding being wound with and continuously interleaved with a portion of the turns of said first winding to provide a predetermined capacitance between said first and second windings, one turn of each of said windings being electrically connected to a common terminal, and first and second tap changing means connected to the turns at the ends of one of said windings for changing the active turns at the inner and outer ends, respectively, of one of said windings to vary the voltage applied to said capacitance substantially independently of the ratio between the turns of said first and second winding.

6. A transformer comprising a first winding including a plurality of turns of a layer of conducting sheet material and a layer of insulating sheet material generally spirally wound together, a second winding including a plurality of turns of a layer of conducting sheet material and a layer of insulating sheet material, the turns of said second winding starting and stopping at first and second predetermined turns of said first winding and being wound with and continuously interleaved with the adjacent turns of said first winding to provide a predetermined capacitance between said first and second windings, and first and second tap changing means connected to one end and to a turn intermediate the ends of said first winding, respectively, for changing the active turns between said one end and said first predetermined turn of said first winding.

7. A transformer comprising a first winding including a plurality of turns of a layer of conducting sheet material and a layer of insulating sheet material generally spirally wound together, a second winding including a plurality of turns of a layer of conducting sheet material and a layer of insulating sheet material, the turns of said second winding starting and stopping at first and second predetermined turns of said first winding and being wound with and continuously interleaved with the adjacent turns of said first winding to provide a predetermined capacitance between said first and second windings, one turn of each of said first and second windings being connected to a common point, and first and second tap changing means connected to one end and to a turn intermediate the ends of said first winding, respectively, for changing the active turns between said one end and said first predetermined turn of said first winding to thereby vary the voltage applied to said capacitance when a given potential is applied to said first winding substantially independently of the ratio between the turns of said windings.

8. A transformer comprising a first winding including a plurality of turns of a layer of conducting sheet material and a layer of insulating sheet material generally spirally wound together, the width of said insulating sheet material being greater than the width of said conducting sheet material, a second winding including a plurality of turns of a layer of conducting sheet material and a layer of insulating sheet material, the turns of said second winding starting and stopping at first and second predetermined turns of said first winding and being wound with and continuously interleaved with the adjacent turns of said first winding to provide a predetermined capacitance between said first and second windings, and first and second tap changing means connected to one end and to a turn intermediate the ends of said first winding, respectively, for changing the active turns between said one end and said first predetermined turn of said first winding substantially independently of the ratio between the turns of said first and second windings.

9. A transformer comprising a first winding including a plurality of turns of a layer of conducting sheet material having a coat of insulation on at least one side generally spirally wound together, a second winding including a plurality of turns of a layer of conducting sheet material having a coat of insulation on at least one side, the turns of said second winding starting and stopping at first and second predetermined turns of said first winding and being wound with and continuously interleaved with the adjacent turns of said first winding to provide a predetermined capacitance between said first and second windings, and first and second tap changing means connected to one end and to a turn intermediate the ends of said first winding, respectively, for changing the active turns between said one end and said first predetermined turn of said first winding.

10. A transformer comprising a first winding including a plurality of turns of a layer of conducting sheet material and a layer of insulating sheet material generally spirally wound together, a second winding including a plurality of turns of a layer of conducting sheet material and a layer of insulating sheet material, the turns of said second winding starting and stopping at first and second predetermined turns of said first winding and being wound with and continuously interleaved with the adjacent turns of said first winding to provide a predetermined capacitance between said first and second windings, the voltage stress between the adjacent turns of said first and second windings being substantially uniform when a potential is applied to one of said windings, and first and second tap changing means connected to one end and to a turn intermediate the ends of said first winding, respectively, for changing the active turns between said one end and said first predetermined turn of said first winding.

11. A transformer comprising a first winding including a plurality of turns of a layer of conducting sheet material and a layer of insulating sheet material generally spirally wound together, a second winding including a plurality of turns of a layer of conducting sheet material and a layer of insulating sheet material, the turns of said second winding starting and stopping at first and second predetermined turns of said first winding and being wound with and continuously interleaved with the adjacent turns of said first winding to provide a predetermined capacitance between said first and second windings, the voltage stress between the adjacent turns of said first and second windings being substantially uniform when a potential is applied to one of said windings, and means connected to said first winding for changing the active turns between said one end and said first predetermined turn of said first winding substantially independently of the ratio between the turns of said first and second windings.

12. An electrical apparatus comprising a magnetic core, a first winding including a plurality of turns of a layer of conducting sheet material and a layer of insulating sheet material wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between the turns of said first and second windings, one turn of each of the layers of conducting sheet material of said first and second windings being connected to a common terminal, and first and second means for changing the active turns at the inner and outer ends, respectively, of one of said windings in an offsetting manner to maintain the active turns in the latter winding at substantially a predetermined value and to vary the voltage applied to said capacitance substantially independently of the ratio between the turns of said first and second windings, said first and second means being connected in circuit relation with the latter winding.

13. A transformer comprising a first winding including a plurality of turns of a layer of conducting sheet material and a layer of insulating sheet material generally spirally wound together, a second winding including a plurality of turns of a layer of conducting sheet material and a layer of insulating sheet material, the turns of said second winding starting and stopping at first and second predetermined turns of said first winding and being wound with and continuously interleaved with the adjacent turns of said first winding to provide a predetermined capacitance between said first and second windings, the voltage stress between the adjacent turns of said first and second windings being substantially uniform when a potential is applied to one of said windings, and means connected to said first winding for changing the active turns between said one end and said first predetermined turn of said first winding substantially independently of the ratio between the turns of said first and second windings while maintaining the active turns in said first winding at substantially a predetermined value.

References Cited in the file of this patent

UNITED STATES PATENTS

| | | |
|---|---|---|
| 1,807,797 | Rump | June 2, 1931 |
| 2,521,513 | Gray | Sept. 5, 1950 |
| 2,686,239 | Burbeck | Aug. 10, 1954 |
| 2,874,359 | Christofel | Feb. 17, 1959 |